US005886533A

United States Patent [19]

Satake et al.

[11] Patent Number: 5,886,533

[45] Date of Patent: Mar. 23, 1999

[54] CONTROLLING WATER ADDITION TO GRAINS USING FEEDBACK TO MATCH A TARGET MICROWAVE VALUE

[75] Inventors: Satoru Satake, Tokyo; Yoshimasa Tomoyasu, Hiroshima, both of Japan

[73] Assignee: Satake Corporation, Tokyo, Japan

[21] Appl. No.: 908,921

[22] Filed: Aug. 8, 1997

[30] Foreign Application Priority Data

Aug. 13, 1996 [JP] Japan .................................... 8-232473
Jul. 10, 1997 [JP] Japan .................................... 9-199194

[51] Int. Cl.[6] ..................................................... G01N 22/04

[52] U.S. Cl. .............................. 324/640; 324/639; 73/73; 426/231

[58] Field of Search .................................... 324/637, 639, 324/640; 73/73; 426/231, 507

[56] References Cited

U.S. PATENT DOCUMENTS

| | | | |
|---|---|---|---|
| 3,714,818 | 2/1973 | Relph | 73/73 |
| 4,128,052 | 12/1978 | Mueller et al. | 99/516 |
| 4,326,163 | 4/1982 | Brooke | 324/640 |
| 4,485,284 | 11/1984 | Pakulis | 73/73 |
| 4,994,286 | 2/1991 | Greer | 426/231 |
| 5,133,982 | 7/1992 | Bodkin et al. | 426/231 |
| 5,194,275 | 3/1993 | Greer | 426/231 |
| 5,708,366 | 1/1998 | Nelson | 324/640 |
| 5,714,887 | 2/1998 | Nelson | 324/640 |

FOREIGN PATENT DOCUMENTS

| | | |
|---|---|---|
| 1 620 127 | 1/1991 | U.S.S.R. . |
| 90/07110 | 6/1990 | WIPO . |

OTHER PUBLICATIONS

Soviet Inventions Illustrated Section PQ, Week 9137, Derwent Publications Ltd., Oct. 30, 1991.

*Primary Examiner*—Diep N. Do
*Attorney, Agent, or Firm*—Fish & Richardson, P.C.

[57] ABSTRACT

A water adding control apparatus includes a microwave detecting unit which enables the detection of microwave value proportional to the water content amount of the water added grain and which makes it unnecessary to make calculations for an estimated water content value of the water added grains. The water adding process is started by inputting initial water adding amount, the microwave value of the raw grain after the addition of water is measured, the measured microwave value is set as the target microwave value which serves as control reference, and the water adding amount is feed-back controlled for the actually measured microwave value to constantly match the target microwave value.

17 Claims, 4 Drawing Sheets

CONTROLLING WATER ADDITION TO GRAINS USING FEEDBACK TO MATCH A TARGET MICROWAVE VALUE

BACKGROUND OF THE INVENTION (1) Field of the Invention

The present invention relates to a method and an apparatus for adding water to grains such as wheat grains for adapting the grains to subsequent processes, and more particularly to a method and an apparatus for making a precise control of an amount of water addition to the grains.

(2) Description of the Related Art

Conventionally it has been well known to irradiate microwaves to an object and to measure water content values from microwave values obtained from their absorption characteristics based on the magnitude of water contents of the object. Particularly for adding water to wheat grains or tea leaves, use of the water content measurement by means of microwave detection has been known. In such a case, the water contained in the grain itself and the water attached to a peripheral portion of the grain immediately after the water addition are simultaneously measured and, on the consideration that the water on the peripheral portion of the grain is absorbed thereinto with a lapse of time, the water content is calculated by making various corrections in factors such as a temperature, a thickness of each grain and a density of the grains.

That is, at a time immediately after the water addition to the grains, since the water is in a state in which it is attached to a surface of each grain and also since such water attached is necessarily included when the water content of the grain immediately after the water addition is measured, the water content value obtained then is only an estimated water content value on the estimation that the water attached to the periphery of grain will be absorbed into the inside of the grain with a lapse of time. Since the water content value measured at this stage includes an element of estimating the water absorption to the grain after the water addition, it is difficult in practice to carry out the measurement of water content with a high precision. That is, in carrying out such measurement, the measured microwave value is converted into the water content value by using a calibration curve which is determined by water content value obtained in advance and the microwave value. In the case where the water content is thus obtained from the calibration curve, the corrections are made in factors such as a temperature, a grain thickness and a grain density, and the measurement is made for the estimated water content value as a substitute for the absolute water content value. However, the precision of the water content value obtained in this way can be expected to have a precision only in the order of 1%. Depending on purposes or uses, the precision demanded for the water content value may be lower in some exceptional cases, but under the current practice a value of low precision cannot be utilized as reference for control particularly in the case of water addition to wheat grains.

The water addition to the wheat grains is very important for purposes of obtaining wheat flour in its best property and enhancing the yield of the flour. For the flour-milling industry, it is important from the aspect of the weight of the end flour product that, within the limit in which the property of the flour is not caused to be deteriorated, the water content value be controlled to as high as possible, for example, up to about 17%. It is known that, in wheat grains (for example, hard wheat grains), the grinding thereof results in 2% of water loss from the water content value (for example, 16%) of the water added raw grains. The water addition to the raw grains is made with the above matters taken into consideration. However, since the water content of the wheat grains after being ground is proportional to the magnitude of the water content of the water added wheat grains and also since no water can be added to the wheat grains after being ground, it is to be noted that a stable and uniform water adjustment during the water adding stage to the raw wheat grains is very important.

Generally the amount of the grains processed during the milling process is very large so that a difference in the water content even in the order of 1% in weight largely affects the magnitude of the total weight of the end products, which in turn largely affects the sales price of the final end products. Thus, it is necessary that the difference of the water adding amount during the water adding stage be made as small as possible. The conventional water addition control using microwave values is based on the estimated water content value whose precision can be only up to about 1% as already explained, and this is far from meeting the requirements.

In the case of wheat flour, the difference in the water content has a direct bearing and a large influence on the magnitude in weight of the end products so that the error in the order of 1% means that, if the error is assumed to be 1% in weight of the water content and the processing amount is assumed to be 200 tons per day, the difference per day amounts to 2 tons which is 1% of the processing amount of 200 tons per day. Thus, assuming that there are 200 operating days in a year, the total loss per year results in 400 tons. Conversely, if this difference of 1% is controlled advantageously, an annual profit of 400 tons results under the same condition. Naturally, this trend will be more significant with an installation having a capacity of processing a larger amount of grains. Assuming that the price of the wheat flour is JP¥140/Kg., the difference of 1% in weight results either in a loss or a profit of JP¥56,000,000 annually.

Incidentally, for the grains having a variety of water content values, in order to apply an appropriate amount of water thereto in such a way that their water content values become constant, a feedback control method has generally been carried out. In the feedback control method in which the water content is detected by a microwave detection device, the estimated water content value of the water added grains is measured, and then this estimated water content value and the target water content value are compared, whereby the water to be added is feedback-controlled in accordance with the difference resulting from the comparison. The resulting difference may be large because the measurement error in the estimated water content value may eventually be enlarged to as large a value as several percents by calculation, so that the value involving a large error has heretofore been used only as an error admitted yard stick, and in practice the tempering process to follow is relied upon for correcting the error. With respect to wheat flour, etc., it is said that the presence of unevenness in water in the raw wheat grains to be ground is detrimental to the flour milling so that the quality of the end product depends very largely on the water adding step or process.

Further, the fact that the raw grains in the same lot does not necessarily mean that the water content values thereof are the same, so that it is necessary to take the variations therein into account. However, as already explained, since it is not possible in practice to make a precise measurement of the water content values of the grains after the water addition thereto, it is not possible to make an exact judgment as to whether the water content value adjusted in accordance with the water content of the grains before the water addition thereto is accurate or not.

A further method to be considered is one in which the water content of the raw grains is measured by a resistance type water content meter having a comparatively high precision and to control the amount of water content by a feed-forward control method. However, this resistance type is unsuited for the continuous control of a large amount of grains because the measurement intervals are long, the time required for the measurement is long, and the amount of sample is small.

SUMMARY OF THE INVENTION

An object of the invention is to overcome the problems existing in the prior art, and to provide an apparatus for adding water to grains in which actual amount of water added to the grains is measured without calculating an estimated water content value of the grains after the water has been added thereto and, based on this actual measured value, a feedback control of the amount of water addition is carried out, whereby the water addition and the water adjustment can be made precisely and, even when there occur variations in the water content values in the raw gains, an appropriate control thereof can be made in an exact and quick manner.

In a water adding unit for adding water to raw grains, first an initial water adding value is determined by inputting a material water content value, a target water content value and a supply flow rate of the raw grains. After the water adding process based on the initial water adding value thus determined, a microwave value of the initial water added grains is measured by a microwave detection device, and this microwave value is set as a target microwave value to be used subsequently as comparison reference, and a feed-back control of the amount of adding water is made such that the microwave value thereafter always matches the target microwave value. The microwave value detected from the grain after the water addition thereto is the total amount of the water content of the grain itself and the water attached to the peripheral portion of the grain. Thus, as long as the amount of adding water is controlled so that the microwave value after the water addition is kept constant, it can be judged that the water content value after the water addition to the grain is always constant.

As the water content value of the raw grain is first measured and the amount of the water to be added is determined, the microwave value that appears after the water addition corresponds to the total of the water content value of the grain itself after the necessary water being added and the water value of the water attached to the periphery of the grain. The microwave value obtained in a realtime mode is utilized, so that there is no need to make any corrections unlike in the calculation of the estimated water content value representing a water content value after a lapse of time. There is no need to use any values with corrections so that the likelihood for any error to occur is extremely small.

In the steps to follow, based on the material water content value which is the actually measured value, the water is added in accordance with the amount of water obtained by the calculation made together with the target water content value, and the microwave value first obtained is made a target value, so that it can be said that the microwave value is the actually measured value without any corrections having been made. With this value as the target value, the water adding unit is feed-back controlled for this value to match the subsequent microwave values. In this way, unlike in the conventional control using the estimated water content value, the present invention enables the control by use of the actually measured microwave values.

In the apparatus according to the invention wherein the water adding unit for adding water to raw grains is disposed in a flow passage of the apparatus, there is provided a microwave detection device for measuring the microwave values of the grains after the addition of water, in addition to the provision of the water content measuring unit for measuring water content values of the raw grains and the water adding unit for adding the water to the raw grains. The water adding unit may be of any type as long as it permits the water to penetrate into the grains with a lapse of time and it also permits the water to be uniformly added to the grains. Also, the water adding unit may incorporate various means such as a stirring means and a conveying means. These units or devices are all connected to the operation control device and controlled thereby. The operation control device receives the amount of flow rate of the raw grains, the water content of the raw grains, and the desired target water content after the addition of water, and it calculates, based on these initial values inputted thereto, the initial amount of water to be added to the raw grains. The water addition unit is controlled in accordance with the thus calculated initial amount of water to be added. The initial microwave value measured by the microwave detection device for the water added grains firstly outputted from the water addition unit is set or stored in the operation control device as the target microwave value. The operation control device then calculates the differences of water of the water added grains in comparison with the stored target microwave value, and further feed-back controls the water addition unit in accordance with the calculated differences of water.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are described hereunder with reference to the accompanying drawings.

Figure 1:
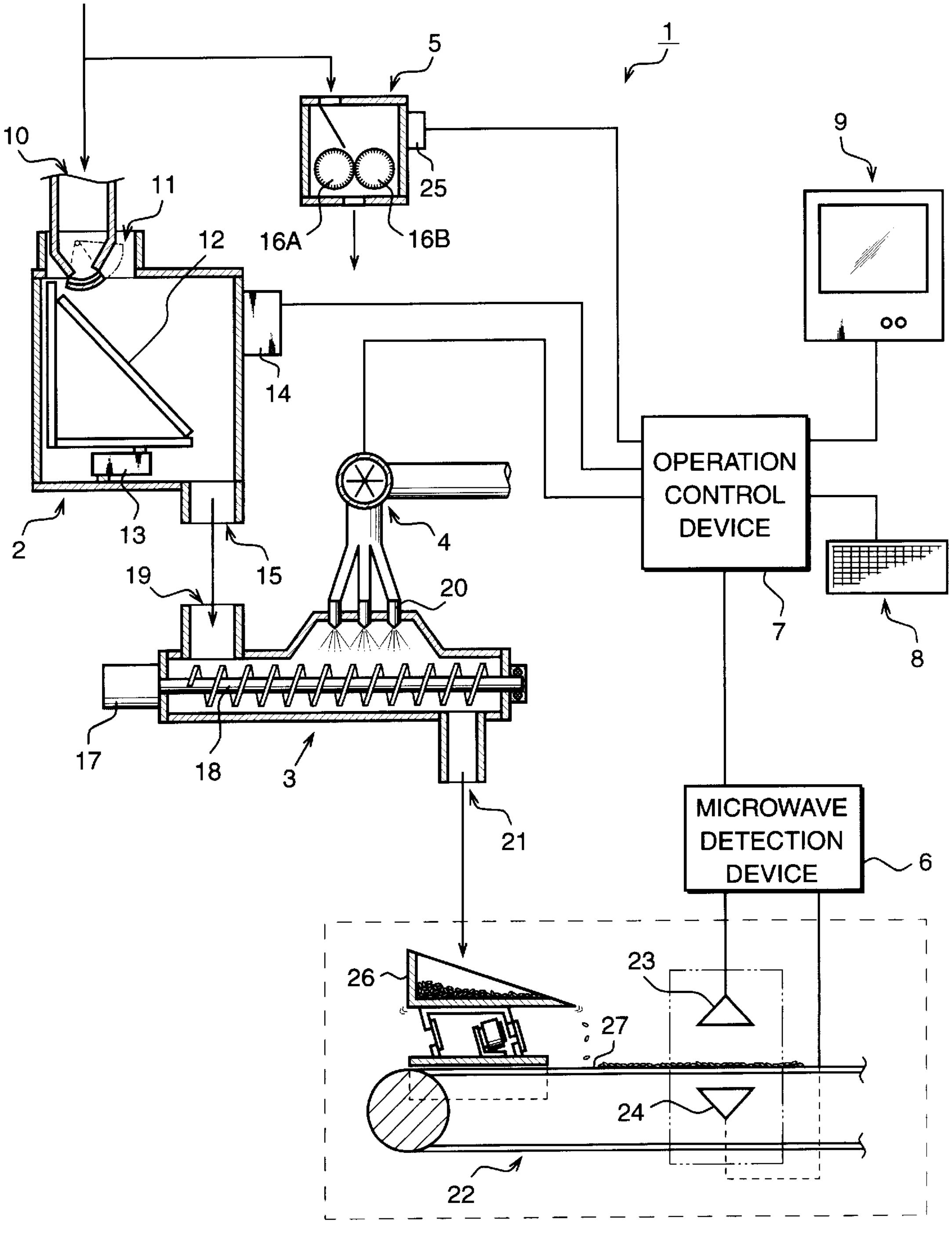
FIG. 1 is a diagram showing a water adding control apparatus of a first embodiment according to the invention.

FIG. 1 illustrates an apparatus of a first embodiment according to the invention, which is of a continuous flow detection type wherein the detection of microwaves is made in a state in which the grains are constantly flowing.

The numeral 2 in FIG. 1 depicts a flow meter with which the flow rate of raw grains is measured and from which the grains are discharged at a constant rate. The raw grains supplied to a supply port 10 of the flow rate meter 2 are subjected to the regulation of their passing rate at a valve shutter 11. The raw grains whose passing rate has been regulated by the valve shutter 11 flow down on an impact plate 12 whereby the weight of the grains is detected by a load cell 13. The weight thus detected is converted into the flow rate at a control section 14 and the valve shutter 11 is controlled such that the flow rate is kept constant according to the converted flow rate value. By the flow rate meter 2, the raw grains are supplied at a constant rate to the next step from its discharging port 15. The flow rate meter does not have to be any particular meter as long as it measures the flow and it does not have to posses the function of discharging grains at a constant rate. That is, the flow rate meter is not limited to that used and illustrated in the present embodiment and can employ a simpler construction which does not have the constant rate discharging function. Also, if the flow rate of the raw grains has already been measured during the previous step, such measured value may well be utilized. On the other hand, a part of the raw grains is introduced into a grain water content meter 5. This grain water content meter 5 measures an electric resistance value of the grains supplied between its rotary electrodes 16A and 16B, and the electric resistance value is converted into a water content value at a control section 25. The grains whose electric resistance has been measured are discharged to the outside of a flow passage. The illustrated water content meter 5 of the grains is of a resistance type, but this is not limited to the resistance type since the purpose is met as long as the measurement can be carried out precisely. Also, if the water content has already been obtained during the previous step, such data may be utilized so that there is no need to provide a separate water content meter.

Next, the numeral 3 depicts a water adding unit in which the grains supplied from a supply port 19 from an upstream of a stirring screw 18 driven by a driving device 17 are stirred, while being conveyed by the stirring screw 18, in the presence of the water atomized at water adding holes 20. The grains to which the water has been added and which have been stirred are discharged from the outlet 21 at a downstream side of the stirring screw 18. Other alternatives of the water adding unit include one in which the grains are supplied onto a belt conveyor and the water is applied from thereabove, or one in which use is made of a mesh type conveyor belt and the water is applied both from above and below this belt. The water adding holes 20 communicate to an adjustable water adding valve 4 connected to a water source such as a reservoir tank (not shown), and the amount of water added to the grains is controlled by the adjustment of the adjustable water adding valve 4.

The water-added and stirred grains are supplied to a conveying unit 22 used in the step to follow. At a conveying starting end of the conveying unit 22, there is provided a vibrating feeder 26 which receives the water added grains discharged from the outlet 21 of the water adding unit 3, and the grains thus received are supplied onto a conveying belt 27 of the conveying unit 22 in such a way that a uniform layer of the grains is formed on the conveying belt 27. In order to accurately detect the microwaves of the water added grains, it is important for the grains on the conveying belt 27 to be of a uniform layer. In the conveying passage of the conveying unit 22, there is provided a microwave detection device 6 which includes a transmitting section 23 for irradiating microwaves to the to-be-measured subject and a receiving section 24 for receiving the microwaves that have transmitted through the to-be-measured subject. The location of the microwave detection device 6 is not limited as long as the water content relating to the water added grains can be measured as microwave values and the influence from the time lag in the overall control system can be minimized.

All of the above means, namely, the flow rate meter 2, the grain water content meter 5, the adjustable water adding valve 4 and the microwave detecting unit 6, are connected to an operation control device 7 through respective signal lines. Further, connected to the operation control device 7 are an input keyboard 8 and a monitor television 9, or a monitor television having a data-input touching switch function such as the so-called “touch panel”. As explained, the water adding control apparatus 1 has as its constituent elements the water adding unit 3, the adjustable water adding valve 4, the microwave detection device 6, and the operation control device 7 which controls the input and output of data to and from these means and the overall operations thereof.

Figure 2:
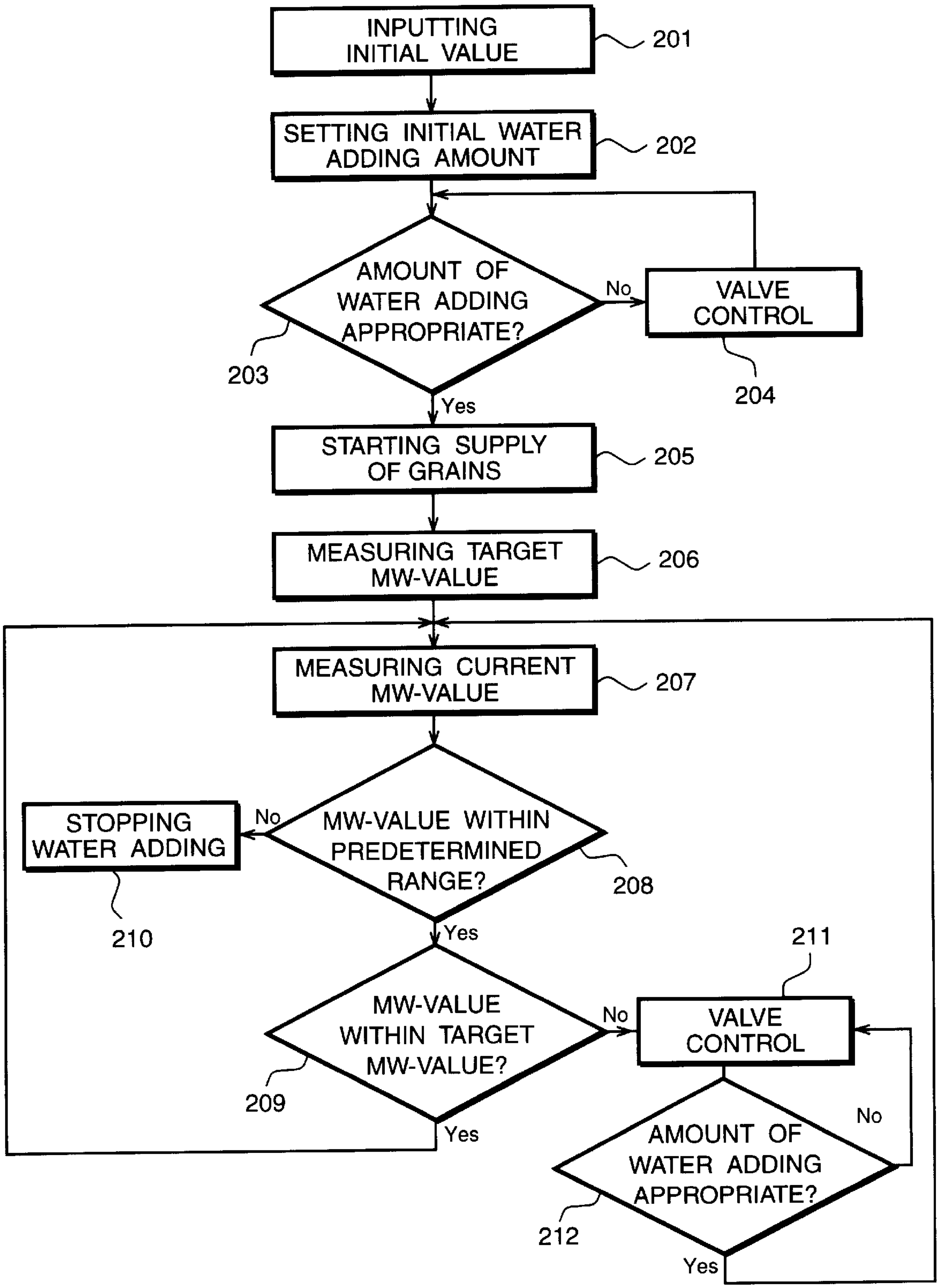
FIG. 2 is a flow chart showing the water addition control used in the apparatus of the first embodiment shown in FIG. 1.

In the construction explained above, the control flow of the operation control device 7 is explained with reference to FIG. 2. First, at an initial input step 201, a material water content value of the raw grains, a target water content value, and a flow rate value of the raw grains supplied are inputted to the operation control device 7 as initial values. Here, the material water content value is a value which has been measured at the grain water content meter 5, the flow rate value is a value which has been measured at the flow rate meter 2, and the target water content value is a value which is externally inputted from the keyboard 8 as a desired water content value.

Next, at an initial water adding amount setting step 202, the initial water adding amount is determined based on the three initial values inputted at the previous step 201. Specifically, the operation control device 7 calculates the necessary initial water adding amount in accordance with the following equation (1):

$$\text{Water adding amount}(L/Hr) = \text{Flow rate}(T/Hr) \times \frac{\text{Target water content}(\%) - \text{Material water content}(\%)}{100 - \text{Target water content}(\%)} \quad (1)$$

As to the flow rate of the raw grains, a flow rate value measured in advance is inputted. However, it is also possible to input from the control section 14 the value measured by the flow rate meter 2 provided as shown in the first embodiment (see FIG. 1). In this case, however, it is necessary to consider the time lag caused by the distance between the flow rate meter and the water adding unit so that the grain flow rate value can be inputted before the water adding amount is subsequently adjusted.

Next, the adjustable water adding valve 4 is controlled for the initial water adding amount (Steps 203 and 204). Specifically, where the water pressure applied to the adjustable water adding valve 4 is constant, the water adding amount can be adjusted by only a precise control of the opening degree of the adjustable water adding valve 4. Alternatively, the water adding amount may be measured by a separately provided fluid flowmeter and the opening degree of the adjustable water adding valve 4 may be controlled based on the measured value. Where the flow rate is different from the initial water adding amount, the adjustable water adding valve 4 is adjusted.

When the water adding amount has become an appropriate amount through the adjustment of the adjustable water adding valve 4, the supply of the raw grains is started accordingly at the step 205.

Then, the raw grains supplied to the water adding unit 3 receive water and, while being stirred, absorb the water. The raw grains discharged from the outlet 21 are supplied to the conveying unit 22. At the conveying unit 22, the microwave value is measured by the microwave detecting unit 6 (Step 206). At this time, the microwave value is measured of the initial grains to which the water has been added. This microwave value is inputted and stored in the operation control device 7 as the target microwave value (target MW value) which serves as reference for subsequent microwave value measurement. If the water adding process is to continue for a long time, it is desirable that the target microwave value (target MW value) be set not only once but be re-set in predetermined intervals. In such a case, it is necessary that the material water content value, the flow rate, etc. be measured again and be inputted in the control device.

Next, at the step 207, the current microwave value is continuously measured.

Further, at the step 208, a judgment is made as to whether the microwave value currently being measured (current MW value) falls within a predetermined range which is set as a comparatively wide range. If the water added grains are present, the current MW value falls within the predetermined range and thus the process proceeds to the next step 209 explained later. For example, if one lot of the water added grains comes to an end and the flow of the grains on the conveying unit 22 is interrupted, then the microwave value greatly changes and deviates greatly from the predetermined range. From this, it is judged that the raw gains have ended. In this case, the process proceeds to the step 210 and the water adding operation at the water adding unit 3 is terminated.

At the step 208, if it is judged that the water added grains are present on the conveying unit 22, the process proceeds to the step 209. At the step 209, the microwave value currently measured (current MW value) at the microwave detection device, it is judged whether the target microwave value (target MW value) set at the previous step 206 is within a permissible range. Here, the current microwave value that is compared with the target microwave value is not an estimated water content value at the time when the water added to the grains is finally absorbed, but is a value that is measured with not only the actual water content in the grains included but also the water attached to the surface of the water added grains included. The fact that the current microwave value is stabilized means that the total value of the water content of the grains and the water added to the grains is stabilized and, since the microwave value becomes stable by the control of the adding of the water, there is no possibility for an error to occur in the controlling of the amount of water to be added. Here, in the case where the current microwave value (current MW value) is judged as being outside the target microwave value (target MW value), the amount of water to be added requiring the control is calculated by the following equation (2):

$$\text{Water adding amount}(L/\text{Hr}) = \text{Flow rate}(T/\text{Hr}) \times \frac{\text{Target } MW \text{ value} - \text{Current } MW \text{ value}}{100 - \text{Target } MW \text{ value}} \times \text{Coefficient} + \text{Current water adding amount} \quad (2)$$

At the step 211, the adjustable water adding valve 4 is controlled based on the amount of water to be added, which is calculated in accordance with the equation (2) in the operation control device 7. Based on the positive or negative symbol of the values of water adding amount obtained by the equation (2), the control is made for an increase or decrease of the water that is required with respect to the current water adding amount. At the step 212, it is judged whether the amount of opening or closing degree of the adjustable water adding valve 4 based on the control of the adjustable water adding valve 4 has been appropriate. If this is judged to be not appropriate, the adjustable water adding valve 4 is readjusted and, if judged to be appropriate, the process returns to the step 207 and the measurement of the current microwave values are repeated. These sequential operations enables the appropriate control of the amount of water to be added.

Next, a second embodiment of the invention is explained with reference to FIG. 3, wherein the grains to which the water has been added are once accumulated in a predetermined amount thereof and the microwave values are measured by irradiating microwaves on the grains at rest. The difference in the second embodiment from the first embodiment resides in the point that, whereas in the first embodiment the microwave values of the water added grains are measured in their flowing state while being conveyed to the next step or process by the conveying unit, the second embodiment is so arranged that a bypass for the grains to be measured is provided in parallel with a main pass for the water added grains which is connected to the outlet 21 of the water adding unit 3, and here a part of the water added grains accumulates to a predetermined amount whereby the microwave values of the accumulated grains are measured under a static state. The construction in other respects is basically the same as that of the first embodiment shown in FIG. 1 so that the detailed explanation is not repeated. The second embodiment relates to an arrangement wherein the portion enclosed in dotted lines in FIG. 1 is replaced by a structure shown in FIG. 3.

Figure 3:
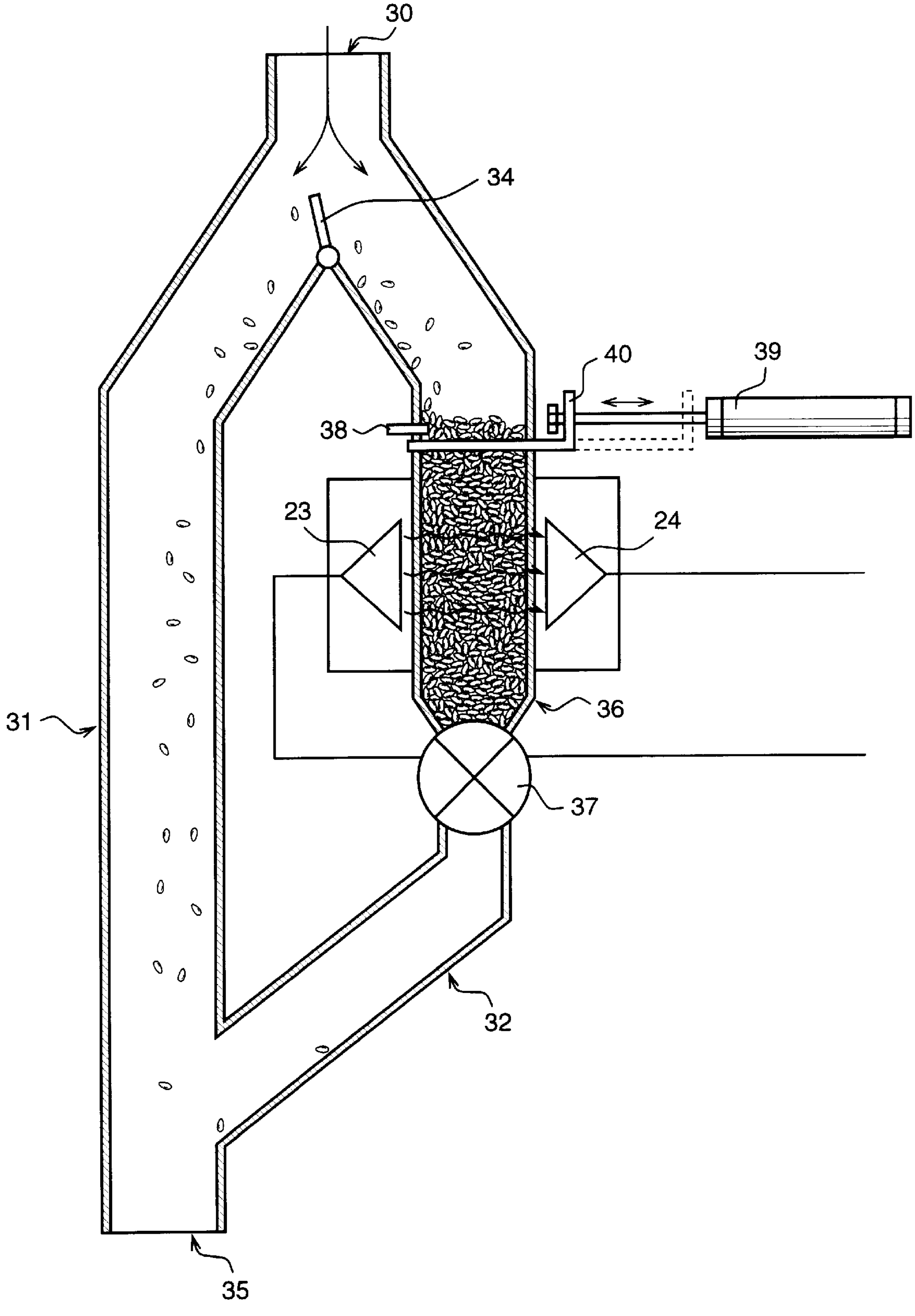
FIG. 3 is a diagram showing a measuring section of a water adding control apparatus of a second embodiment according to the invention.

FIG. 3 shows a detailed structure of a measuring section of the second embodiment of the invention. In this embodiment, immediately after the outlet 21 of the water adding unit 3, there is connected a feeding port 30 of a water added grain passage consisting of a main pass 31 and a bypass 32 for the measurement. In a mid-way to the measuring bypass 32, there is provided a measuring section 36 having a microwave transmitting section 23 and a microwave receiving section 24 which are disposed opposite to each other. A partition plate 34 which is provided at a dividing portion between the main pass 31 and the measuring bypass 32 is for dividing the water added grains into the main pass 31 and the measuring bypass 32 at a predetermined dividing ratio. The water added grains divided by the partition plate 34 and led to the main pass 31 flow down directly to an outlet 35 of the water added grain passage, are discharged therefrom and are forwarded for the next step or process. The water added grains divided by the partition plate 34 and led to the measuring bypass 32 are accumulated in the measuring section 36 with a lapse of time after the closure of a rotary valve 37. When the accumulated grains are fully loaded in the measuring section 36, this state is detected by a full-load sensor 38 arranged at an upper part of the measuring section 36 and an air-cylinder 39 is urged so that a shutter 40 provided at a tip of the air-cylinder is caused to move to a location shown in a solid line in FIG. 3 and that the accumulation of the water added grains in the measuring section 36 is stopped. Thus, in this embodiment, the measurement of the microwave values of the water added grains accumulated in a predetermined amount in the measuring section 36 is carried out by irradiating microwaves onto the grains at rest or in a static state.

Figure 4:
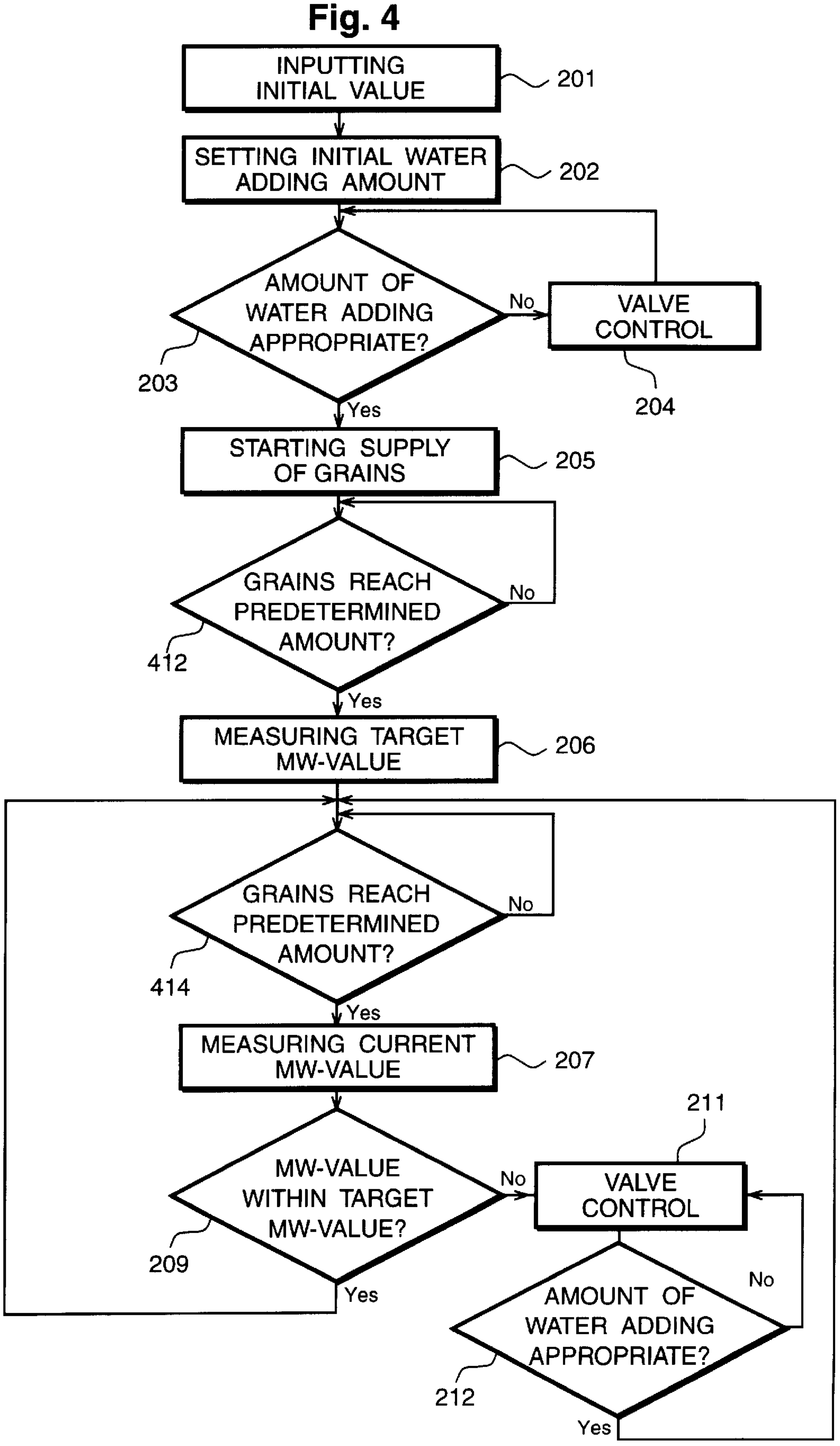
FIG. 4 is a flow chart showing the water addition control used in the apparatus of the second embodiment shown in FIG. 3.

FIG. 4 is a flow chart of the operations according to the second embodiment of the invention. The first difference in the flow in the second embodiment from that in the first embodiment is that the flow chart of FIG. 4 for the second embodiment additionally includes the step 412 and the step 414 at each of which the judgment is made as to whether the amount of the grains accumulated in the measuring section 36 is in a state permitting the microwave values to be measured. This first difference is attributed to the fact that the measurement of the microwave values in the second embodiment is a batch type measurement. A second difference is that the step 208 for judging the presence of the water added grains in the first embodiment is not necessary in the second embodiment. This second difference is attributed to the fact that, whereas the first embodiment is for measuring the microwave values continuously, the second embodiment is for measuring the microwave values on a spot basis.

At the step 205 for starting the supply of raw grains, the grains are introduced and, when the rotary valve 37 is closed, the grains accumulate in the measuring section 36. At the step 412, the judgment is made as to whether the amount of the accumulated grains is in a state permitting the measuring of the target microwave values. Specifically, this judgment is made based on the signal detected from the full-load sensor 38. When the state of full-load is detected by the full-load sensor 38, the process proceeds to the step 206 for measuring the target MW value whereby the target microwave value is measured. Thereafter, the rotary valve 37 is opened, and the grains flow down to the outlet 35 and are discharged. Subsequently, for measuring the current microwave values, the amount of the grains newly accumulated is judged at the step 414 as to whether the amount is in the state permitting the measuring of the current microwave values and, when the state of full-load is detected by the full-load sensor 38, the process proceeds to the step 207 for the measurement of the current MW values whereby the current microwave values are measured.

Between the first embodiment and the second embodiment, there are no other differences in their operations, so that the explanation therefor is omitted.

As to the amount of the water to be added to wheat grains, it is sufficient if the water added is to the extent that it is attached to the surface of the wheat grains. One may generally imagine a higher amount of water, but the water added to the extent that it drips from the grains is certainly too much. In the case of wheat grains, if one grain weighs about 0.035 gram and if it is attempted to add 3% water to the raw grain to increase 14% water to 17% water in the raw grain, the amount of water in weight added to one grain is 0.00126 gram so that it is sufficient if the water added is to the extent that it wets the surface of the grain. However, in the conventional measurement of microwaves, the water on the surface of the grain was measured as the water inside the grain and, only after making various corrections thereto, the measured value was calculated into the water content value of the water added grain.

According to the invention, the water adding amount is determined using as reference the water content before the water is added to raw grains and, since the microwave value of the grain after the addition of water according to the determined water adding amount is made the target value for controlling the addition of water, it is the actual measured value that is used as the reference, it is not necessary to make the corrections that are otherwise necessary for obtaining the estimated water content value, and it is possible to enhance the measurement precision because the same microwave value is compared with in controlling the matching of the actual measured microwave value and the target water content value. In making conversion of the microwave value to the water content value, use is made of a reference microwave table. Since no corrections are made for the estimated water content value, the same table can be used and this also contributes in enhancing the precision.

According to the invention, it is not the estimated water content value but is the microwave value of the water added grains. That is, unlike in the conventional arrangement wherein the water content value of the water added grain had to be estimated, it is possible according to the invention to obtain as the actual measured value the microwave value of the grain and its surrounding, including the water attached to the periphery of the grain, thereby enabling to confirm whether the amount of water added to the grain is appropriate or not and to control the water adding amount based on the actual measured value. Thus, the invention has established a means for effectively adding water to the grains and a method for controlling the adding of the water.

According to the invention, the key feature is in the provision of the microwave detecting unit which enables the detection of microwave value proportional to the water content amount of the water added grain and which makes it unnecessary to make any corrections in a temperature, a grain thickness, etc. in calculating the water content value of the water added grain. All that is necessary is to input some initial values and the target value so that the water adding control apparatus is simple and can be fabricated at a low cost.

The data that are externally inputted (or set) are only the flow rate of the raw gains, the material water content value and the target water content value for the raw grains, and the control can be carried out using input values conventionally available. Further, in the case where the batch type is adopted, wherein the microwave values of the accumulated grains are measured under a static state, the control of the water content for the grains can be effected more precisely.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A method for controlling water addition to raw grains in which a water content value of the raw grains is adjusted to attain a target water content value by controlling an amount of water added to the raw grains, said method comprising:

measuring a water content value of the raw grains prior to adding water to the raw grains;

measuring a flow rate of raw grains being supplied to a water adding unit;

calculating an initial amount of water to be added based on the measured water content value, the measured flow rate of the raw grains, and a desired target water content value;

adding water to the raw grains in the water adding unit based on the calculated initial amount of water;

measuring an initial microwave value of the raw grains following discharge from the water adding unit;

setting a target microwave value based on the measured initial microwave value;

after setting the target microwave value, measuring a subsequent microwave value of subsequent raw grains following discharge from the water adding unit;

comparing the subsequent microwave value to the target microwave value; and using a result of comparison as feed-back to control an amount of water to be added by the water adding unit such that the subsequent microwave value substantially matches the target microwave value.

2. A method for controlling water addition to raw grains according to claim 1, in which the water added grains discharged from the water adding unit are conveyed as a uniform grain layer and the microwave value is continuously measured by irradiating the microwave onto said uniform grain layer of the water added grains.

3. A method for controlling water addition to raw grains according to claim 2, in which the microwave is irradiated from one side of the grain layer of the water added grains, and a transmitted microwave is received from the other side of the grain layer.

4. A method for controlling water addition to raw grains according to claim 1, in which the microwave value is intermittently measured by accumulating a predetermined amount of a part of water added grains discharged from the water adding unit and irradiating the microwave onto the accumulated water added grains.

5. The method of claim 1 in which the water content value of the raw grains is measured by measuring predetermined physical properties of the raw grains.

6. The method of claim 1 in which the water content value of the raw grains is measured by measuring electric resistance value of the raw grains.

7. The method of claim 1 wherein using a result of the comparison as feed-back comprises decreasing an amount of water addition if the measured microwave value is greater than (e) receive an initial microwave value of the raw grains;

(f) store the initial microwave value of the raw grains as a target microwave value for comparison reference;

(g) receive a subsequent microwave value of subsequent raw grains that is measured following discharge from the water adding unit;

(h) compare the subsequent microwave value with the target microwave value; and (i) use a result of the comparison as feed-back to control an amount of water to be added by the water adding unit such that the subsequent microwave value substantially matches the target microwave value.

8. An apparatus for controlling water addition to raw grains in which a measured water content value of the raw grains is adjusted to attain a target water content value by controlling an amount of water added to the raw grains, said apparatus comprising:

a water adding unit for adding water to raw grains;

a microwave detection device for detecting a microwave value of the raw grains by irradiating microwaves onto the raw grains following an addition of water by the water adding unit; and an operation control device configured to perform the following operations:

(a) receive the water content value of the raw grains prior to water being added to the raw grains;

(b) receive a flow rate of raw grains being supplied to a water adding unit;

(c) receive a desired target water content value;

(d) calculate an initial amount of water to be added based on the water content of the raw grains, the flow rate of raw grains, and the desired target water content value; side of the layer of the raw grains to which water is added by the water adding unit, and a signal receiving section for receiving transmitted microwaves from the other side of the water added grain layer.

9. An apparatus for controlling water addition to raw grains according to claim 8, which further comprises a conveying unit for continuously supplying to said microwave detection device in a uniform layer raw grains to which water is added by the water adding unit.

10. An apparatus for controlling water addition to raw grains according to claim 9, in which the microwave detection device comprises a signal transmitting section for irradiating microwaves onto one the target microwave value, and increasing an amount of water addition if the measured microwave value is less than the target microwave value.

11. An apparatus for controlling water addition to raw grains according to claim 10, which has at a conveying starting end of said conveying unit a vibration feeder for making the water added grains a uniform layer.

12. The apparatus of claim 10 wherein the signal receiving section is arranged opposite to the signal transmitting section with the water added grain layer being disposed therebetween.

13. An apparatus for controlling water addition to raw grains according to claim 8, which further comprises an accumulating section for accumulating a predetermined amount of a part of the grains to which the water has been added by the water adding unit and supplying intermittently the accumulated grains to said microwave detection device.

14. An apparatus for controlling water addition to raw grains according to claim 13, in which said accumulating section is disposed in a by-pass connected in parallel with a conveying pass connected to an outlet of said water adding unit, and which comprises a valve means for selectively opening or closing a flow pass of the water added grains passing through the by-pass, a detecting means for detecting the accumulated water added grains to reach the predetermined amount after the closing of said valve means, and a shutting means for shutting the by-pass to terminate the accumulation of the water added grains based on the detection signal of said detecting means.

15. The apparatus of claim 8 wherein the water content value used to calculate an initial amount of water is measured based on predetermined physical properties of the raw grains.

16. The apparatus of claim 8 wherein the water content value used to calculate an initial amount of water is measured based on electric resistance values of the raw grains.

17. The apparatus of claim 8 wherein using a result of the comparison as feed-back comprises decreasing an amount of water addition if the subsequent microwave value is greater than said target microwave value, and increasing an amount of water addition if the subsequent microwave value is less than the target microwave value.

* * * * *

UNITED STATES PATENT AND TRADEMARK OFFICE

CERTIFICATE OF CORRECTION

PATENT NO. : 5,886,533

DATED : March 23, 1999

INVENTOR(S) : Satake, et al

It is certified that error appears in the above-identified patent and that said Letters Patent is hereby corrected as shown below:

Column 11, claim 7, delete lines 28-39 in their entirety and insert therefor:
--the target microwave value, and increasing an amount of water addition if the measured microwave value is less than the target microwave value.--

Column 12, claim 8, delete lines 4-7 in their entirety and insert therefor:

--(e) receive an initial microwave value of the raw grains;

(f) store the initial microwave value of the raw grains as a target microwave value for comparison reference;

(g) receive a subsequent microwave value of subsequent raw grains that is measured following discharge from the water adding unit;

(h) compare the subsequent microwave value with the target microwave value; and (i) use a result of the comparison as feed-back to control an amount of water to be added by the water adding unit such that the subsequent microwave value substantially matches the target microwave value.--

UNITED STATES PATENT AND TRADEMARK OFFICE

CERTIFICATE OF CORRECTION

PATENT NO. : 5,886,533

DATED : March 23, 1999

INVENTOR(S) : Satake, et al

It is certified that error appears in the above-identified patent and that said Letters Patent is hereby corrected as shown below:

Column 12, claim 10, line 15, after "one" delete the remainder of the line through line 17 in their entirety and replace therefor:
--side of the layer of the raw grains to which water is added by the water adding unit, and a signal receiving section for receiving transmitted microwaves from the other side of the water added grain layer.--

Signed and Sealed this

Seventeenth Day of August, 1999

Attest:

Q. TODD DICKINSON

Attesting Officer

Acting Commissioner of Patents and Trademarks